Nov. 5, 1929.  A. G. KROCKER  1,734,137
DISHWASHER
Filed Oct. 12, 1927  2 Sheets-Sheet 2

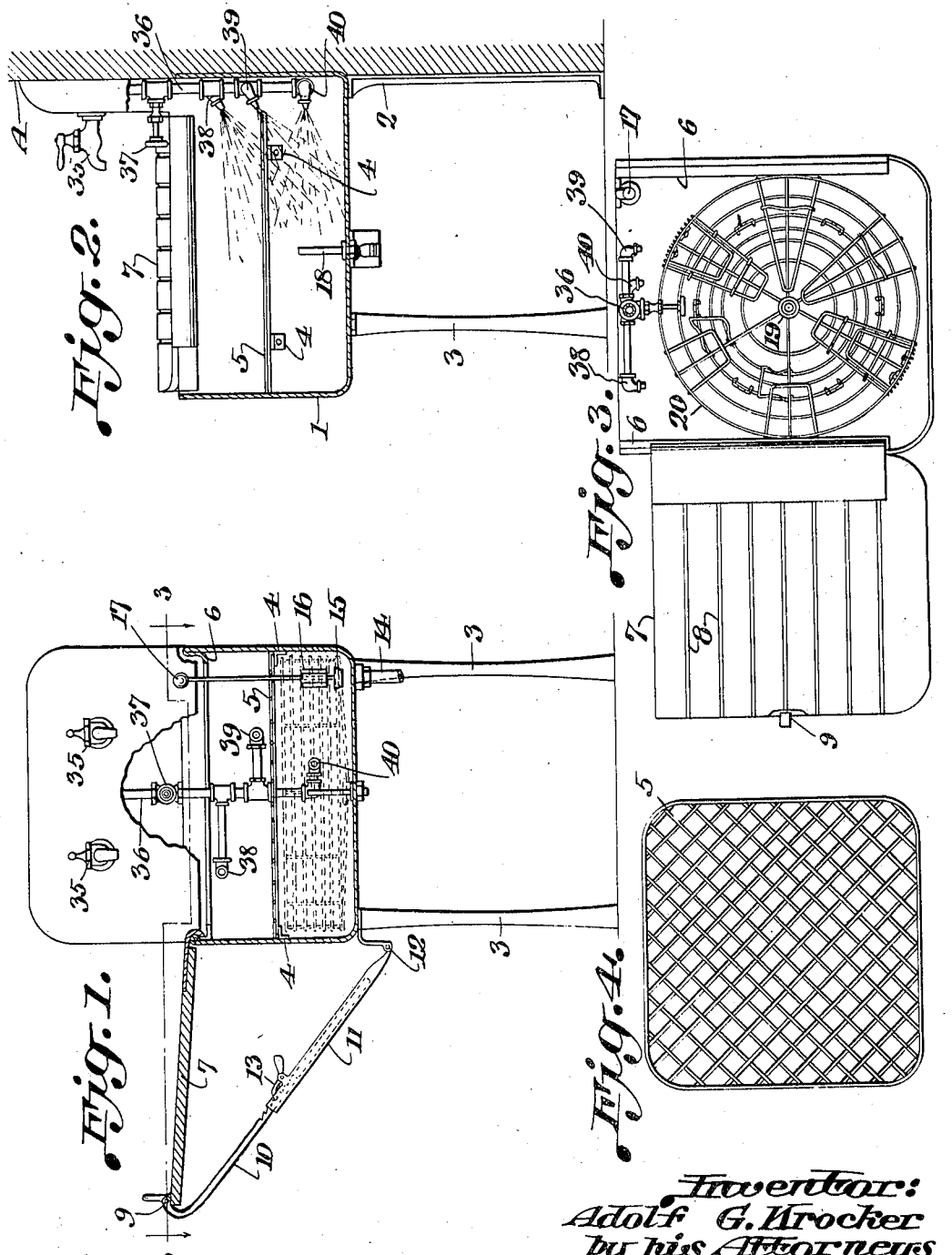

Inventor:
Adolf G. Krocker
by his Attorneys
Baldwin & Wight

Patented Nov. 5, 1929

1,734,137

UNITED STATES PATENT OFFICE

ADOLF G. KROCKER, OF WACO, TEXAS

DISHWASHER

Application filed October 12, 1927. Serial No. 225,668.

This invention relates to a dish washer which may take the place of the usual kitchen sink, but is particularly adapted for washing dishes. The container for the dishes is located within the sink proper and is mounted for free rotation, while the supply of hot water is introduced through a plurality of pipes which discharge the same against the container and dishes in such manner as to produce a rotation of the same. The container itself is a wire basket member particularly formed to hold various shapes and sizes of dishes in proper position to receive the jets of hot water.

Further details of the invention will be apparent from the following description and the appended claims.

In the drawings:

Figure 1 is a vertical section with parts in elevation.

Figure 2 is a similar vertical section with parts in elevation taken at right angles to the section of Figure 1.

Figure 3 is a top plan view on the line 3—3 of Figure 1.

Figure 4 is a top plan view of a shelf detached.

Figure 5:
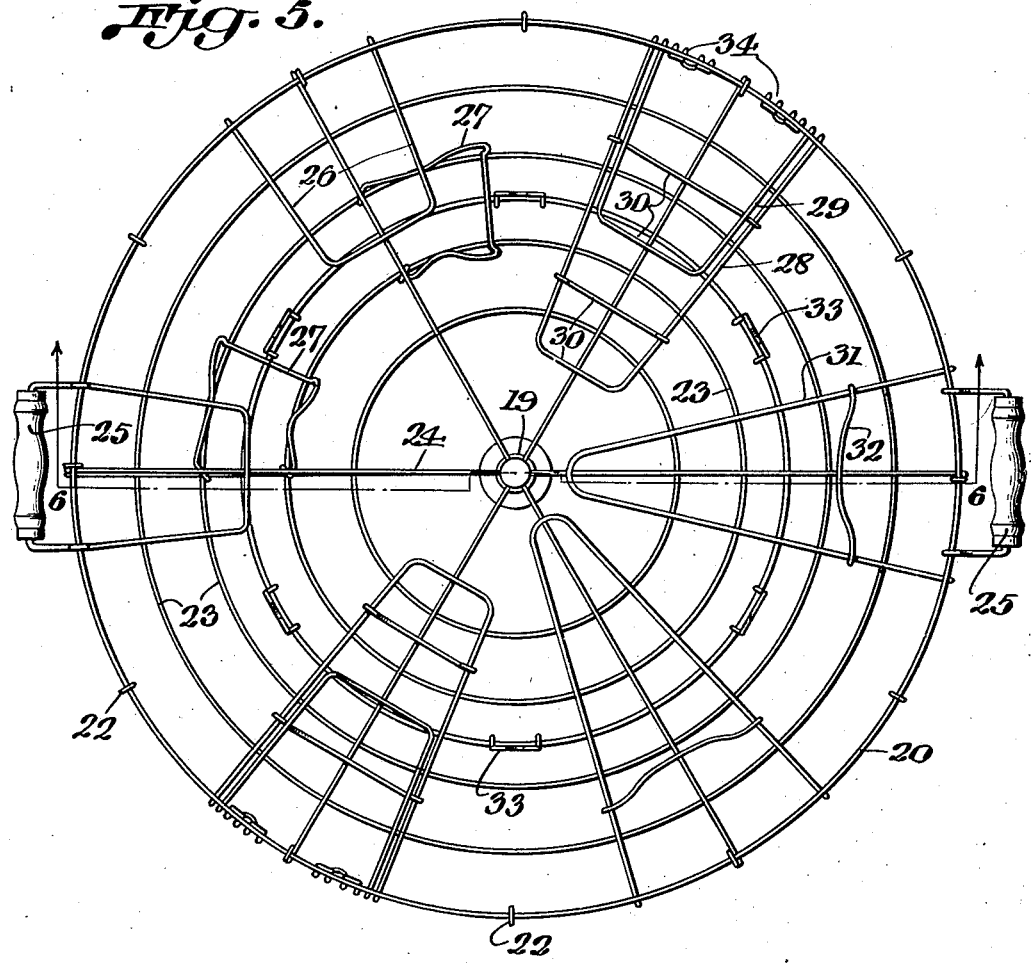
Figure 5 is a top plan view of the wire basket or dish holder.

The dish washer embodies a container 1 which may take the place of the usual sink and be similar thereto in form and size. It may be supported by a rear leg 2 and two front legs 3. The inside of the container is provided with small angle brackets 4 upon which may be supported when desired a shelf 5 formed with interwoven wires and shown in plan view in Figure 4. The top of the member 1 may have its edges turned down to form flanges 6 upon which may be supported a cover member 7 as desired. This cover member is provided with drainage grooves 8 and may be used as a support as shown in Figures 1 and 3. The outer end of this shelf may be attached preferably by some form of hinge as shown at 9 to one end of a brace member 10, which telescopes with a member 11 connected at 12 to a bracket extending from the sink. These two members are adjustably positioned by means of a suitable latch 13 in order to permit the shelf 7 to occupy different positions. The container or sink member 1 will be provided with a drain pipe 14 which may be closed by a plug 15 carried by a stem passing through a guide 16 and having an operating knob 17 at its upper end. The container is also provided near its center with a short standard 18 fastened to the bottom thereof.

Figure 6:
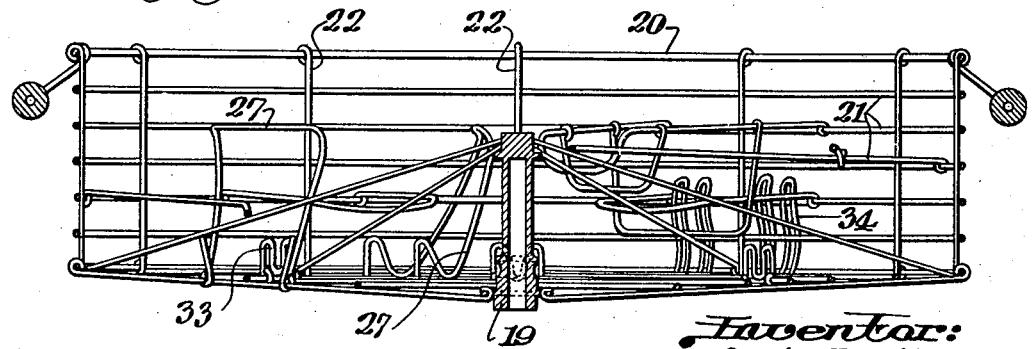
Figure 6 is a section on the line 6—6 of Figure 5.

The dish holder is in the form of a cylindrical wire basket 20 having a central hollow standard 19 adapted to fit over the standard 18 and rotate freely thereon. This holder is formed of a plurality of circumferential wires 21 attached to standards 22 and has a bottom member formed of a plurality of concentric wires 23 connected by cross wires 24 attached at their inner end to the standard 19. This dish holder is provided with handles 25 and also with various interior supporting devices for receiving and holding dishes and other kitchen utensils in suitable relation to each other. There is shown a holder 26 shaped to receive cups, glasses and the like and adjacent thereto a wire 27 is bent into appropriate shape to receive saucers or smaller plates. A containing member is formed by two outer wires 28 and 29 connected by cross wires 30 forming a tray like member to receive knives, forks, and the like. There is also provided a holder 31 having a cross wire 32 which may receive cups, glasses or irregular pieces. Certain of the concentric wires 23 have attached thereto members 33 of a form clearly shown in Figure 6 adapted to receive the edge of a plate and hold the same in vertical position. Other plates may be stacked between the plate held by the member 33 and the adjacent wires 26, 27, 28, or 31 as the case may be. The outside of the basket adjacent the holder 28—29 is provided with a plurality of upstanding wires 34 which prevent knives and other smaller articles from sliding out of the holder through the side of the basket.

The dish washer may be provided with the usual hot and cold water faucets 35 and a hot water pipe 36 extends downwardly and is controlled by a separate valve 37. Attached to this pipe are branches which terminate in nozzles 38, 39 and 40, these branches being of different length and extending to opposite sides of a vertical plane passing through the standard 18, the nozzle 38 being disposed at one side of the plane and the nozzles 39 and 40 being disposed at the other side of said plane and closer thereto than the nozzle 38. When the basket 20 is filled with dishes, it is set in position with the standard 19 fitting upon the fixed pivot 18 and if desired a shelf 5 may be placed in position. Other articles might be placed upon the shelf if desired. The cover 7 may then be placed upon its supporting ledge 6 and the valve 37 opened to admit hot water through the nozzles 38, 39 and 40. The hot water issuing from these nozzles will strike against the basket and the dishes therein at such angles that they will not only clean the dishes thoroughly, but will cause the container to rotate and thereby bring all sides of the dishes into position to be cleansed by the hot water. It is to be noted that the jets issuing from the nozzle 38 will impinge upon one face of each of the dishes in the container at a point sufficiently near the periphery of the container to cause rotation of the latter, while the jets issuing from the nozzles 39 and 40 will impinge upon the opposite faces of each of the dishes at points nearer the center of the container so that opposite faces of each of the dishes in the container are subjected to the cleaning action of separate jets of water positively directed upon each face, while the jets issuing from the nozzles 39 and 40 will tend to resist rotation of the container, their effect will not be sufficient to arrest rotation, because the nozzle 38 is located farther from the center of the container than the nozzles 39 and 40. When the operation is over, the cover 7 may be placed in the Figure 1 position where it acts as a shelf and the basket can be lifted out of the container 1 and placed upon said shelf to drain the dishes. The plug 15 will be opened by operation of the handle 17 and the water allowed to escape from the container. Whenever it is desired to use the container as a sink, the shelf 5 may be placed in position or the device may be used as a sink for the shelf 5.

It is apparent that the invention provides a very efficient device which has all the functions of the ordinary kitchen sink but in addition thereto furnishes simple and satisfactory means for rapidly washing dishes. It is also apparent that many features of the invention may be modified as to their precise physical embodiment without in any way departing from the spirit of the invention, which is to be regarded as limited only by the scope of the appended claims.

I claim as my invention:

1. In a dishwashing machine, the combination with a receptacle; of a vertical standard supported by the bottom of the receptacle; a container for dishes rotatably supported on said standard; a plurality of nozzles arranged to discharge water against dishes in said container, two of said nozzles being disposed on opposite sides of and at unequal distances from a vertical plane passing through said standard and perpendicular to a vertical plane in which the said two nozzles lie, whereby a jet of water issuing from the nozzle farthest from said plane will impinge upon one face of each of the dishes in the container to cause rotation of the latter, and a jet of water issuing from the other nozzle will impinge upon the opposite face of each of the dishes, the jets being parallel to the first mentioned plane; and means for supplying water to said nozzles.

2. In a dishwashing machine, the combination with a receptacle; of a vertical standard supported by the bottom of the receptacle; a container for dishes rotatably supported on said standard; a plurality of nozzles arranged to discharge water against dishes in said container, two of said nozzles being disposed on opposite sides of and at unequal distances from a vertical plane passing through said standard and perpendicular to a vertical plane in which the said two nozzles lie, whereby a jet of water issuing from the nozzle farthest from said plane will impinge upon one face of each of the dishes in the container to cause rotation of the latter, and a jet of water issuing from the other nozzle will impinge upon the opposite face of each of the dishes, the jets being parallel to the first mentioned plane, said nozzles being arranged in different horizontal planes and inclined so as to discharge upon the dishes in the container at different angles; and means for supplying water to said nozzles.

In testimony whereof, I have hereunto subscribed my name.

ADOLF G. KROCKER.